UNITED STATES PATENT OFFICE.

HENRI RAYMOND VIDAL, OF PARIS, FRANCE.

THIAZIN DYE.

SPECIFICATION forming part of Letters Patent No. 601,363, dated March 29, 1898.

Application filed February 26, 1897. Serial No. 625,209. (Specimens.) Patented in France July 3, 1896, No. 231,188.

*To all whom it may concern:*

Be it known that I, HENRI RAYMOND VIDAL, of Paris, France, have invented certain new and useful Improvements in the Manufacture of Coloring-Matters, (patented in France July 3, 1896, No. 231,188,) which are fully described in the following specification.

This invention has reference to the production of coloring-matters from thiazin derivatives having hydroxyl or amidogen in the para position in each nucleus by reaction on one or more such derivatives (or mixture for yielding the same) with sulfur or sulfur and ammonia, causing concentration of the thiazin molecules to tetraphenetrithiazin products having hydroxyl or amidogen in the para position in each nucleus at the ends of the chains of four nuclei. Where ammonia is not present in the materials treated, it may be added, or an equivalent, such as phospham, used instead.

Examples will be given herein of specific reactions sufficient to enable those skilled in the art to which the invention relates to comprehend and practice the same.

Sulfur acting in presence of ammonia on the paradioxythiazin gives rise to the formation of a deep-black coloring-matter by the condensation of two molecules of paradioxythiazin under the following conditions:

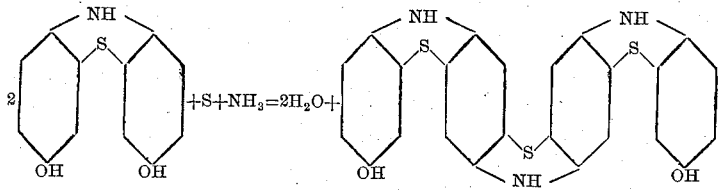

The black color is paradioxytetraphenetrithiazin. It is soluble with blue coloration in concentrated sulfuric acid, soluble with like coloration in hot alkalies, soluble with green coloration in sulfid of sodium, and with yellow coloration in the meta-bisulfites.

Example: I heat in a close vessel at a temperature of 170° to 220° centigrade for about five hours with constant agitation paradioxythiazin, forty-six kilograms; sulfur, three and one-half kilograms; liquid ammonia, three kilograms. The sulfur and ammonia act likewise on paramidoöxythiazin to give rise to paradiamidotetraphenetrithiazin, the reaction being written like the preceding.

Example: I heat in a close vessel at a temperature of from 170° to 220° centigrade for about five hours with constant agitation paramidoöxythiazin, forty-six kilograms; sulfur, three and one-half kilograms; liquid ammonia, three kilograms.

If I cause sulfur and ammonia to react upon a mixture of paradioxythiazin and paramidoöxythiazin, I obtain paraoxyamidotetraphenetrithiazin.

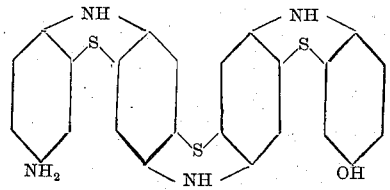

Example: I heat in a close vessel to the temperature of about 220° for five hours with constant agitation paramidoöxythiazin, twenty-three kilograms; paradioxythiazin, twenty-three kilograms; sulfur, three and one-half kilograms; liquid ammonia, three kilograms.

In all the preceding reactions I can replace ammonia by the ammoniacal chlorids of zinc or calcium or by phospham, ($PN_2H$.)

In the case of phospham the three kilograms of ammonia are replaced by one and one-half kilograms of phospham, and it will be understood that in the reactions claimed I mean to include the equivalents of ammonia, particularly phospham.

The new body, paraoxyamidotetraphenetrithiazin, mentioned above, may also be obtained in admixture with paramidoöxythiazin by the reaction of sulfur upon a mixture of paramidophenol and paraphenylenediamin in equal parts.

Example: I heat in a closed iron digester provided with an agitator in an oil-bath at 220° centigrade for five hours paramidophenol, eleven kilos; paraphenylenediamin, eleven kilos; sulfur, six and one-half kilos.

If I cause sulfur alone to react as before on paramidothiazin, I obtain a black coloring-matter paradiamidotetraphenetrithiazin, which is able to undergo a further condensation and to furnish coloring-matter slightly soluble in the alkaline sulfids.

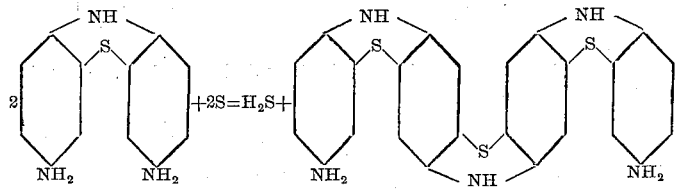

Example: I heat in a closed iron digester provided with an agitator for five hours at 220° paradiamidothiazin, forty-six kilograms; sulfur, six and one-half kilograms.

I can also cause sulfur to react on a mixture of paramidoöxythiazin and paradiamidothiazin. I then obtain paramidoöxytetraphenetrithiazin

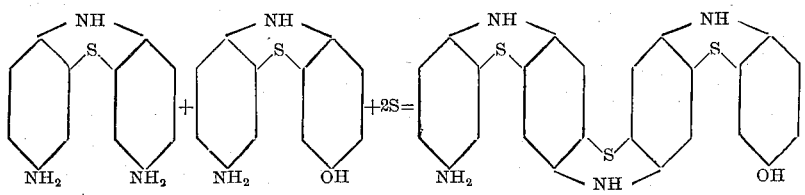

Example: I heat in a closed iron digester provided with an agitator for five hours at 220° paramidoöxythiazin, twenty-three kilograms; paradiamidothiazin, twenty-three kilograms; sulfur, six and one-half kilograms.

I can replace in the preceding reaction the mixture of paramidoöxy and paradiamidothiazin by the reduction mass either of paranitroöxyazobenzene or of oxydisazobenzene $(C_6H_5-N=N-C_6H_4-N=N-C_6H_4.OH)$ and sodium sulfid at 250° in an oil-bath.

Having now fully described my invention, what I claim as new, and desire to secure by Letters Patent, is—

1. The method of obtaining coloring-matters from para substitution products of thiazin derivatives, by reaction with sulfur on one or more such products, or mixtures for yielding the same, and consequent condensation of the thiazin molecules to tetraphenetrithiazin products, one or more of said thiazin derivatives having amidogen in the para position in one nucleus and one of the specified hydrogen-containing groups in the para position in the other nucleus, and the resultant tetraphenetrithiazins having one of the specified hydrogen-containing groups in the para position in each of the nuclei at the ends of the chain of four nuclei, substantially as described.

2. The method of obtaining coloring-matters from para substitution products of thiazin derivatives, by reaction with sulfur and ammonia on one or more such products, or mixture yielding the same, and consequent condensation of the thiazin molecules to tetraphenetrithiazin products, one or more of said thiazin derivatives having one of the specified hydrogen-containing groups in the para position in each of the thiazin nuclei and the resultant tetraphenetrithiazin having one of the specified hydrogen-containing groups in the para position in each of the nuclei at the ends of the chain of four nuclei, substantially as described.

3. The described coloring-matters derived from thiazin compounds, which coloring-matters are tetraphenetrithiazin products with hydroxyl or amidogen in the para position in each of the nuclei at the ends of the chain of four nuclei, and are black powders soluble in concentrated sulfuric acid, in sulfites and soluble in hot alkalies generally, as set forth.

In testimony whereof I have signed this specification in the presence of two subscribing witnesses.

HENRI RAYMOND VIDAL.

Witnesses:
EDWARD P. MACLEAN,
ANTOINE ROUSSARMAT.